June 12, 1962   A. O. HUNGERFORD ETAL   3,038,210
METHOD OF PRODUCING PLASTIC LENSES
Filed June 6, 1955

Albert O. Hungerford
Patrick J. Mullane
INVENTORS.

BY ATTORNEY.

3,038,210
METHOD OF PRODUCING PLASTIC LENSES
Albert O. Hungerford and Patrick J. Mullane, Kansas City, Mo., assignors to Parmelee Plastics Company, Kansas City, Mo., a corporation of Missouri
Filed June 6, 1955, Ser. No. 513,387
3 Claims. (Cl. 18—58)

This invention relates to the production of optical lenses from plastic material. More particularly it relates to improvements in the methods disclosed in U.S. Patent No. 2,241,415, issued to H. R. Moulton on May 13, 1941, U.S. Patent No. 2,319,014, issued to C. V. Smith on May 11, 1943, U.S. Patent No. 2,333,051, issued to C. V. Smith on October 26, 1943, U.S. Patent No. 2,406,361, issued to M. N. Fairbank et al. on August 27, 1946, and U.S. Patent No. 2,542,386, issued to J. O. Beattie on February 20, 1951, and especially the last-mentioned of such patents.

Although the methods disclosed by the mentioned prior patentees are generally satisfactory for many purposes, it has been found that the quality of the finished lenses produced can be even further improved by performing the general processes in a modified fashion wherein certain conditions are found to be essentially critical for best results.

Accordingly, it is the primary object of this invention to teach the nature of such improved method and the way in which such method may be most expeditiously performed to attain the advantages and improved results thereby made possible.

It is another important object of the invention to provide an improved method for the production of optical lenses by polymerization and solidification within suitable mold structure of a cross-linkable resin monomer such as those of the kind of which allyl di-glycol carbonate is typical.

It is another important object of this invention to specifically provide an improved method for the processing and curing of di-ethylene glycol bis (allylcarbonate) to form an optical lens of cross-linked polymer material having optical and physical properties superior to those normally produced with previously known methods and apparatus.

It is another imortant object of this invention to provide such a method wherein a cross-linkable monomer is mixed with a suitable catalyst and then polymerized within the glass mold structure by immersion in a hot liquid bath, then after polymerization, removed from such mold structure and subjected to a final, post-polymerization, curing treatment in hot gas.

It is another of the most important objects of this invention to provide a novel method employing mold structure including a pair of carefully shaped and polished glass mold sections and an O-ring gasket of resilient material for disposition between the mold sections.

Still other important objects of this invention will be made clear or become apparent as the following description of the invention progresses.

As noted by Beattie in his previously identified patent, cross-linkable resin monomers suitable for use in the production of optical lenses include di-allyl phenyl-phosphonate, di-allyl phthalate, ethylene di-methacrylate and methacrylic anhydride. Similarly, he has pointed out that suitable catalyzers for such monomers may be benzoyl peroxide or isopropyl percarbonate.

In preparing the monomeric mixture utilized by the particular method of this invention for obtaining optical lenses of the highest quality, the monomer used is di-ethylene glycol bis (allyl carbonate) mixed with from about 2% to about 5% of isopropyl percarbonate. Since such catalyzing material must be stored at a temperature below zero degrees Fahrenheit, moisture condensation on such catalyst material is normally encountered during handling. Provision for the removal of such moisture from the catalyzed resin mixture is accomplished by adding to such mixture a sufficient quantity of anhydrous sodium sulphate, which serves as a dehydrating agent.

Such mixture of monomeric resin, catalyst and dehydrating agent is then filtered by any suitable means of conventional character capable of removing all particles of over 10 microns in size. Such filtering removes not only any particles of dirt, lint, or other foreign material which may be present in the mixture, but is also effective to remove all of the dehydrating agent. It may be noted that, if the filtered mixture is not to be used or cured immediately, it should be stored in a cool place by virtue of the requirements in this respect of the isopropyl percarbonate used as a catalyzer in the mixture.

Figure 1:
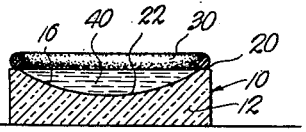
FIG. 1 is a central cross sectional view of the lower, concavely faced, glass section of the mold structure showing the O-ring gasket in place thereon and a quantity of the cross-linkable monomer material in place within the cavity of such lower mold section.
Figure 2:
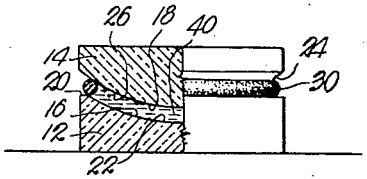
FIG. 2 is a view partially in elevation and partially in central cross section of the assembled mold structure including both the lower and the upper sections thereof and the O-ring gasket therebetween with a quantity of the monomer material within the mold structure and ready for polymerization.
Figure 3:
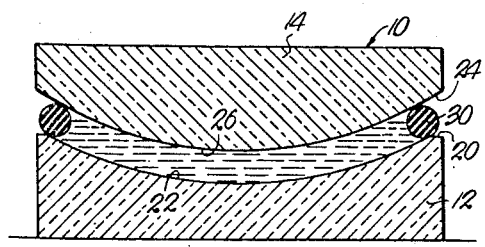
FIG. 3 is an enlarged central cross sectional view of the complete mold structure including both sections and the O-ring gasket thereof with a quantity of the monomer therewithin and ready for polymerization, particularly showing the inner relationship of the O-ring gasket to the concavely faced lower mold section and the convexly faced, upper glass mold section.

Referring now particularly to FIGS. 1, 2, and 3, the numeral 10 generally designates mold structure for use in shaping the monomeric mixture during polymerization thereof. Such mold structure includes a glass section 12 and an upper section 14, preferably of glass, which are preferably of generally cylindrical configuration of between 65 and 71 millimeters diameter and respectively having carefully shaped and polished mold surfaces 16 and 18 formed by careful grinding with conventional glass grinding equipment. Sections 12 and 14 could obviously also be formed of metal, if desired. Mold surface 16 may have its central, lens-forming portion 22 of either toric or spherically generated contour, as may also mold surface 18, although the latter will usually be spherically generated for ophthalmic lenses. Mold surface 16 of lower mold section 12, which is the uppermost surface thereof, includes an annular, marginal portion 20 preferably ground normal to the axis of the section 12, as illustrated, and the concavely curved portion 22. It is noted, however, that marginal portion 20 could, if desired, be ground in any spherically generated configuration relative to a point on the axis of section 12, whether concave or convex with respect to surface 16, the important consideration being that portion 20 present a non-toric ring seat, as will hereinafter become more apparent.

Similarly, mold surface 18, which is the lowermost end surface of upper section 14, includes an annular marginal portion 24, which is either spherically generated relative to a point on the axis of section 14, as illustrated, or normal to the latter and a convexly curved, central lens forming portion 26. It will now be clear that marginal portions 20 and 24 may each be either convex, concave or planar, without regard to the form of the other, as long as they are each of the same diameter and either normal to the axis of the corresponding section 12 or 14 or spherically generated with respect to a point on such axis or its extension. The curvature of central portions 22 and 26 of mold faces 16 and 18 respectively is determined from the desired curvatures of the faces of the lens to be produced with proper compensation being made for the shrinkage occurring in the resin material during polymerization thereof. Thus, portion 22 of mold face 16 and portion 26 of mold face 18 will each be of slightly less curvature than the desired curvature of the corresponding faces of the lens to be produced, as will be hereinafter made more clear.

Mold structure 10 also includes an annular O-ring gasket 30 of normally circular cross section with a diameter of 60 millimeters from center-to-center and a uniform cross sectional thickness of between 2 and 7 millimeters. As will be clear, such dimensions adapt the gasket 30 for resting upon the marginal portion 20 of mold face 16 of lower mold section 12 and for supporting the upper mold section 14 by resting engagement of the marginal portion 24 of mold face 18 thereupon. It is most significant that such gasket 30 shall be resiliently flexible and is preferably formed of polyvinyl chloride. It is also most important that the gasket 30 be of uniform cross sectional thickness and essentially uniform characteristics of resiliency, since such gasket 30 determines the position of upper mold section 14, which it supports, relative to the lower mold section 12.

Continuing now with the explanation of the method of this invention, a carefully measured, predetermined quantity of resin mixture, which before curing is in liquid form, is placed within the cavity of lower mold section 12 formed by mold face 16 thereof while the O-ring 30 is in place upon marginal portion 20 of face 16, but while the upper mold section 14 is removed. Such quantity of resinous mixture in its monomeric form is designated by the numeral 40. The upper mold section 14 is then carefully emplaced upon the O-ring 30 by which it is held in predetermined spaced relationship to the mold section 12. When the quantity of monomeric resinous material 40 has been properly measured, same will of course fully fill the space between portions 22 and 26 of mold faces 16 and 18 respectively and peripherially bounded by the O-ring 30 when the upper mold section 14 is thus emplaced upon the O-ring 30. With the mold structure 10 thus assembled and upper section 14 thereof gravitatively supported by O-ring 30, but without the necessity of any clamping structure, the monomeric material within mold structure 10 is in readiness for polymerization by subjection to heat.

It has been found that such polymerization of the resin material 40 is best accomplished to avoid irregularities, flaws and defects, by curing the same in a hot water bath for certain critical periods and at certain critical temperatures. The periods and temperatures are as follows. The heated water in which the structure 10 containing the monomeric mixture 40 is immersed should be substantially uniformly raised in temperature from approximately 100° F. to approximately 150° F. during a period of approximately 11 hrs. and then maintained at approximately 150° F. for an additional approximately 5 hrs. Curing under such conditions produces what has been found to be the optimum uniformity and quality in the polymerized product.

Figure 4:
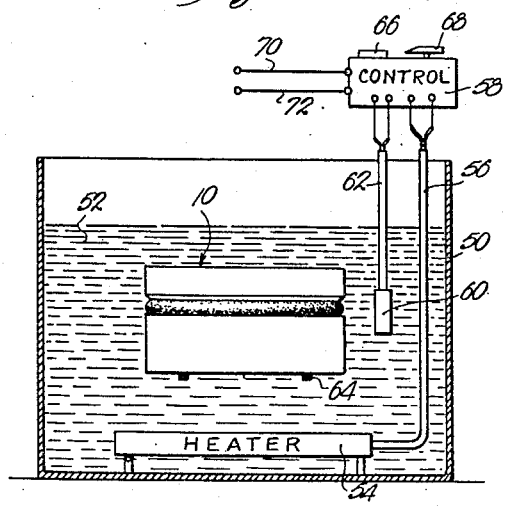
FIG. 4 is an essentially diagrammatical illustration of structure suitable for use in performing the polymerization step of the method of this invention.

In FIG. 4 is illustrated representative structure for accomplishing the polymerization step. It includes a tank 50 containing a quantity 52 of any suitable liquid, such as water, a heating element 54, preferably of electrical nature, connected by wiring means 56 with a control unit 58, a preferably electrically responsive sensing mechanism 60 also connected with control unit 58 by conductive means 62, and a rack or support assembly 64 for holding the mold structure 10 immersed within the liquid 52 but preferably somewhat spaced from the heater element 54. Obviously, means for circulating the liquid 52 within the tank 50, although not shown, may be provided, if desired. The control unit 58 would normally include means 66 for indicating the temperature of the liquid 52 and adjustment means 68 for controlling the action of the heater 54 to maintain the liquid 52 at the desired temperature, a pair of conductors designated 70 and 72 being provided for connection of the control unit 58 with a suitable source of electrical power (not shown). Obviously, a timing and automatic switching or control system (not shown) could be included within control unit 58, if desired, to provide for automatic control of the temperature of liquid 52 at the desired levels throughout the entire polymerizing period, although for purposes of illustration the manual control means shown will be quite satisfactory.

Figure 5:
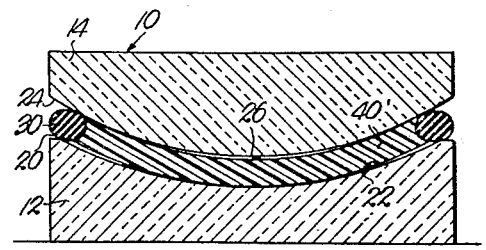
FIG. 5 is an enlarged cross sectional view of the mold structure showing the resin material therein after the polymerization step has been completed.

During polymerization of the mixture 40 the physical dimensions of that quantity 40 of such mixture within mold structure 10 will shrink volumetrically. This results, as shown in exaggeration in FIG. 5, in a drawing away of the polymerized material 40' from the portions 22 and 26 of mold faces 16 and 18 respectively. As would be expected, due to the concave curvature of mold face portion 22, the polymerized material 40 draws away from the latter in increasing amounts as the circumference of the section 12 is approached, while, conversely, the polymerized material draws away from mold face portion 26 increasingly as the center of the latter is approached by virtue of the convex curvature thereof. During such shrinkage of the monomeric material 40 to its polymerized state 40' such material exerts an appreciable adherence to the central part of mold face portion 22 and the circumferential part of mold face portion 26, thereby drawing the mold sections 12 and 14 relatively closer together as polymerization and shrinkage proceed, such relative movement of mold sections 12 and 14 being made possible and controlled by the resilient characteristics of the O-ring gasket 30. The resulting cross sectional distortion of the O-ring 30 is illustrated in exaggeration in FIG. 5, along with the manner of shrinkage of the material 40'. Since the amount of shrinkage during polymerization can be accurately predicted by analytical means and verified through empirical experience, it is clear that the degree of correction or under-curvature to be used in the grinding of mold face portions 22 and 26 in order to produce a particular optical lens configuration can be precisely predicted and accomplished.

It may be noted that the method of this invention also contemplates as a preferential step thereof the rinsing and polishing of the mold face portions 22 and 26 to leave a very thin film of water adhering to such surfaces and extending into the microscopic pores of the polished glass immediately prior to emplacement of the monomeric mixture 40 within the mold structure 10. This has been found to aid materially in permitting the desired shrinkage of the material 40 during polymerization and its pulling away from certain parts of the mold face portions 22 and 26 during the polymerization process. Such feature of the method also aids materially in the releasing of the mold sections 12 and 14 from the completely polymerized material or lens blank 40''.

It may be noted that after the polymerization step described, the polymerized material 40' will be possessed of a hardness of 28 or more when tested on a Barcol hardness tester.

After polymerization is completed in the manner above described, the mold sections 12 and 14 are separated, which separation is expedited by the resilient nature of the gasket 30 permitting insertion of a suitable tool between marginal portions 20 and 24 of mold faces 16 and 18 for use in forcing the mold sections 12 and 14 free from the lens blanks 40'' without damage to the latter. Since such separation is with conventional methods very often a considerable problem whose solution is either wastefully time consuming or likely to inflict damage on the lens blank 40', this advantage inhering in the use and characteristics of the particular type of gasket 30 described is believed significant.

Figure 6:
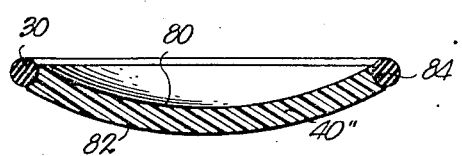
FIG. 6 is a central cross sectional view of the lens blank per se as it appears after completion of the polymerization step and removal from the mold structure.

Referring now to FIG. 6, it will be seen that the fully polymerized lens blank 40'' is provided with a concave face 80 and a convex face 82, each of predetermined curvature. It will also be noted that the edge 84 of blank 40'' is concavely curved from its contact during polymerization with the surface of the gasket 30.

Referring again to the method contemplated by this invention, it has been found that the characteristics of the lens blank 40'', and particularly its physical properties such as hardness, resistance to abrasion and the like, may be materially improved by a further post-polymerization curing step under the conditions now to be outlined. Such post-polymerization step also appears to effect further improvement in the transparency and optical characteristics of the lens blank 40''. Such post-polymerization curing of lens blank 40'' is preferably carried out by subjection of the blank 40'' to hot air whose temperature is gradually raised from room temperature to a temperature of approximately 240° F. during a period of approximately 1 hr., then maintained at a temperature of approximately 240° F. for approximately 2 hours. After such final curing operation the ring 30 will be removed from the blank 40'' and the latter will be edge ground to the desired size (and shape, if other than circular), and will then be cleaned, inspected and packaged or otherwise used in conventional fashion.

Figure 7:
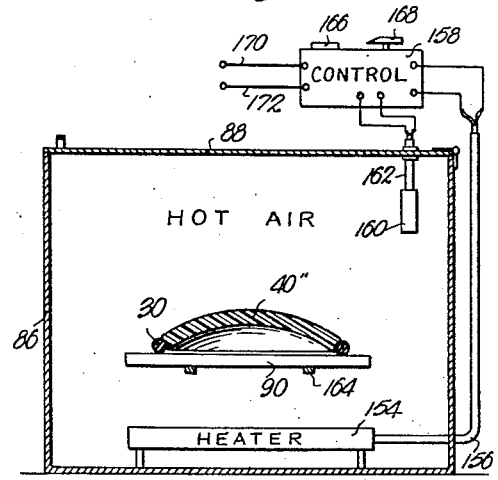
FIG. 7 is an essentially diagrammatical illustration of structure suitable for use in performing the post-polymerization, curing step in the method of this invention.

Referring now to FIG. 7, there is shown illustrative structure by which the post-polymerization curing step may be carried out. The numeral 86 designates a housing having a hinged top 88 and containing a preferably electrical heating element 154 connected with a control unit 158 by means 156, a temperature sensing mechanism 160 connected with control unit 158 by means 162, and a rack or support assembly 164 for supporting a tray 90 to be more fully described. The control unit 158 will normally be provided with temperature indicating means 166, adjustable means 168 for controlling the operation of heater element 154 and conductive means 170 and 172 adapted for coupling with a source of electrical power. Air circulating means (not shown) may obviously be provided within housing 86, if desired.

One or more lens blanks 40'' may be supported within housing 86 in any suitable fashion, the preferred way of accomplishing same being by simply placing such blanks 40'' on tray 90 in inverted condition with the concave side thereof down. The O-ring gasket 30 may be left on the blank 40'' during such post curing step. With a lens of the form illustrated, the gasket 30 only is actually in contact with tray 90. When so supported, it may be noted that the lens blank 40'' has both its optical faces 80 and 82 held out of engagement with the tray 90 and any other structure which might tend to damage the same.

It may be observed, first, that although the method and apparatus contemplated by this invention are ideally adapted for the production of improved opththalmic lenses of all kinds, the applicability of the invention is not necessarily so limited and may extend to the production of lenses of similar type intended for different uses. Secondly, it must be pointed out that certain details of the method and apparatus described for illustration could conceivably be varied somewhat without departing from the true spirit and intention of the invention. It will be understood, therefore, that this invention shall be deemed limited only by the scope of the appended claims.

Having thus described the invention, what is claimed as new and desired to be secured by Letters Patent is:

1. The method of producing a hardened, optical lens from a thermosetting monomeric resin having the characteristics of di-ethylene glycol bis (allyl carbonate) and said lens having curved major surfaces in opposed relationship, said method comprising mixing a predetermined quantity of said material with approximately 2% to 5% by weight of a catalyst therefor; filtering the mixture to remove impurities therefrom; supporting the filtered mixture in a form substantially conforming to the configuration of said lens; immersing the supported mixture in a liquid bath and gradually raising the temperature of the liquid from approximately 100° F. to about 150° F. within a period of approximately 11 hours, and maintaining the temperature at approximately 150° F. for about 5 hours to polymerize said amount of the mixture; removing the polymerized material from said liquid; subjecting the lens presenting polymerized material to an atmosphere of a heated gas having a temperature within the range of approximately 235° F. to about 245° F. and while said opposed major curved surfaces of the polymerized material are free from external support; and removing the polymerized lens presenting material from said atmosphere upon final curing and hardening of the same.

2. A method as set forth in claim 1, wherein during heating of the polymerized lens presenting material within said atmosphere of heated gas, the material is first treated for at least 1 hour to heat of temperature gradually rising from approximately room temperature to about 240° F., then maintained at said last-mentioned temperature for at least 2 hours.

3. The method of producing optical lenses from a resin monomer material which comprises mixing a predetermined quantity of said material with a predetermined quantity of a catalyst substance; filtering the mixture to remove impurities therefrom; supplying a predetermined amount of the filtered mixture to the cavity of mold structure; providing a film of water over the surfaces of the mold structure defining said cavity; closing the mold structure to confine said amount of filtered mixture in said cavity of the mold structure; subjecting the mold structure containing said amount of filtered mixture to immersion in a heated liquid until said amount of filtered mixture is polymerized; removing the polymerized mixture from the mold structure; subjecting the polymerized mixture to an atmosphere of heated gas for a predetermined final curing period; and removing the polymerized and finally cured mixture from said atmosphere of heated gas.

References Cited in the file of this patent

UNITED STATES PATENTS

| | | |
|---|---|---|
| 2,037,375 | Freeman | Apr. 14, 1936 |
| 2,369,593 | Marks et al. | Feb. 13, 1945 |
| 2,379,218 | Dial et al. | June 26, 1945 |
| 2,379,247 | Muskat | June 26, 1945 |
| 2,392,578 | Chenicek | Jan. 8, 1946 |
| 2,485,798 | Whyte et al. | Oct. 25, 1949 |
| 2,525,664 | Gadsby et al. | Oct. 10, 1950 |
| 2,542,386 | Beattie | Feb. 20, 1951 |
| 2,671,932 | Pique | Mar. 16, 1954 |
| 2,728,106 | Herman et al. | Dec. 17, 1955 |